Patented July 14, 1931

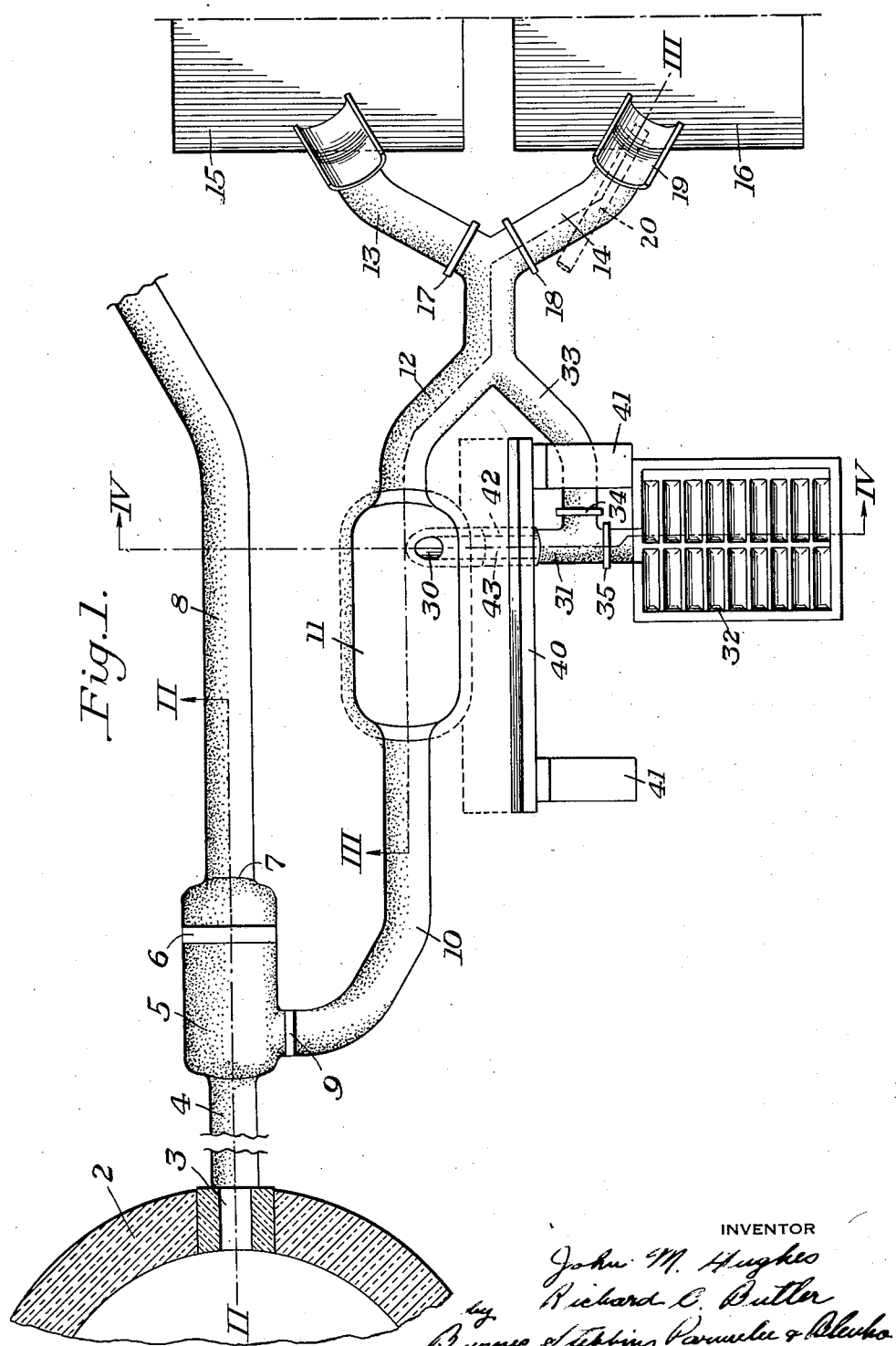

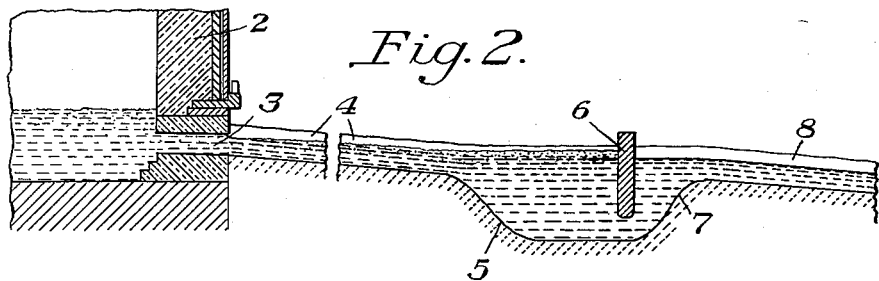
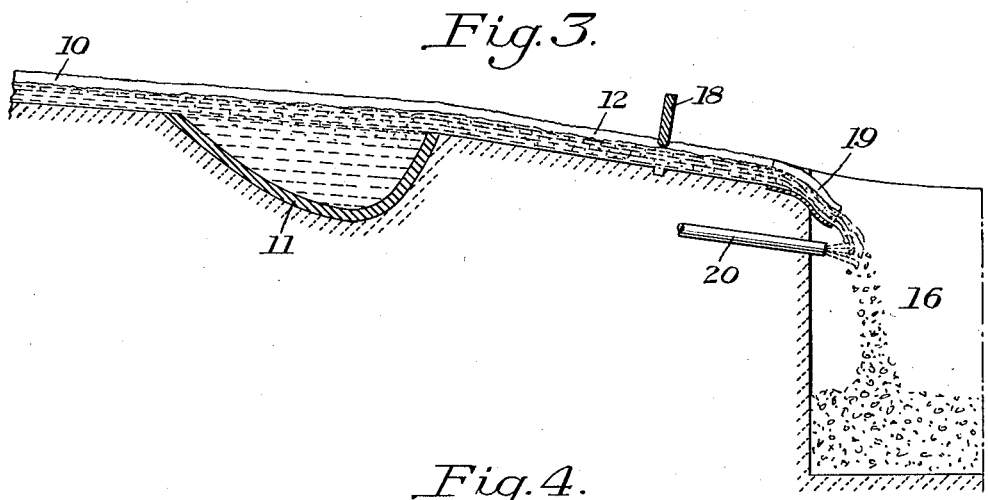
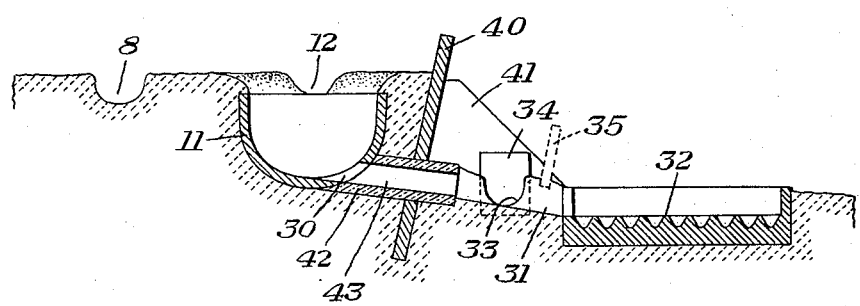

1,814,808

UNITED STATES PATENT OFFICE

JOHN M. HUGHES, OF YOUNGSTOWN, AND RICHARD C. BUTLER, OF LOWELLVILLE, OHIO

METHOD AND APPARATUS FOR TREATING SLAG

Application filed June 3, 1930. Serial No. 459,100.

This invention relates to a method and apparatus for treating blast furnace slag whereby a dense homogeneous slag is produced and in which globules of iron originally suspended in the slag are deposited in a settling tub and thereafter cast while in molten condition to form the usual pig iron of commerce.

In the accompanying drawings which illustrate the present preferred embodiment of our invention, Figure 1 is a schematic plan view of suitable apparatus for carrying out the process;

Figure 2 is a section taken on the line II—II of Figure 1;

Figure 3 is a similar view on the line III—III of Figure 1, and

Figure 4 is a section on the line IV—IV of Figure 1.

In carrying out the process of treating slag in accordance with our invention, the iron and slag flow from a blast furnace 2 through a tapping hole 3 into a skimming runner 4 having a pit 5 formed therein. This runner is generally formed by digging out a groove in the ground, but, if desired, the runner may be of metal lined with clay to prevent the iron from sticking thereto. A skimming gate 6 extends into the pit 5 for separating the slag from the iron. The iron and slag from the runner 4 flow into the pit 5, the gate 6 causing the slag to back up in the pit 5 and runner 4, but allowing the iron to flow under the gate and then over the wall 7 of the pit into the iron runner 8, from which the iron is delivered into ladles (not shown) in which it is conveyed to a pig making machine. If desired, the iron may be conducted from the runner 8 directly into sand beds for making sand cast pig.

As the iron and slag flow from the blast furnace through the runner 4 into the pit 5, the slag gradually backs up behind the gate 6, and when the slag has risen to a sufficient height, it flows over a dam 9 into a slag runner 10.

The slag flowing over the dam 9 contains suspended globules of iron which have not had sufficient time to settle from the slag while in the pit 5. The slag runner 10 communicates with a settling tub 11 through which the slag flows and is then conducted through a runner 12 and either runner 13 or 14 to a hard slag pit 15 or a granulated slag pit 16, according to whether the slag is to be prepared for road building or agricultural purposes.

The settling tub 11 is substantially wider than and several times deeper than the slag runner and is of a length sufficient to hold a relatively large quantity of slag, in order to give the suspended globules of iron an opportunity to settle to the bottom of the tub. The tub is located at a substantial distance from the point where the slag runner 10 joins the pit 5. By spacing the settling tub a substantial distance from the pit 5 the suspended globules of iron tend to settle to the bottom of the runner 10 before they reach the settling tub, where the settling of the iron globules is completed.

The slag flows through the settling tub into the runner 12, and then either through runners 13 or 14 into the hard slag pit 15 or the granulated slag pit 16, the flow of slag being controlled by gates 17 and 18. If hard slag suitable for making concrete or for road building purposes is desired, the hard slag formed in the pit 15 is crushed to the proper size. If it is desired to prepare granulated slag suitable for agricultural purposes, the molten slag is conducted through runner 14 and flows over a delivery spout 19 into the pit 16. As the slag drops into the pit it is sprayed with water issuing from a nozzle 20 which granulates it.

After the flow of iron and slag from the furnace has stopped, there is a considerable quantity of iron in the bottom of the settling tub 11, the pool of iron in the tub having been formed by the settling of the globules of iron which were previously suspended in the slag. During the running of the iron and slag through the settling tub, the outlet opening 30 in the bottom of the tub is closed by a plug (not shown). The plug is now opened and the pool of iron which collected in the bottom of the settling tub flows through an iron runner 31 into a pig bed 32.

The pig bed is preferably formed from a metal casting and is divided into molds having the shape of commercial pig iron. A second slag runner 33 communicates at one end with the iron runner 31 between the settling tub 11 and the pig bed 32, and at its other end with the slag runner 12. During the flow of iron from the settling tub into the pig bed, the gate 34 which controls the flow of slag through the runner 33, is closed and the gate 35, which controls the flow of iron from the settling tub into the pig bed, is opened. The iron is allowed to flow from the settling tub into the pig bed until slag starts to run from the outlet 30, at which time the gate 35 is closed and the gate 34 is opened, thereby causing the slag to flow from the runner 31 into the runner 33 and thence to the runner 12, from which it is delivered to one of the slag pits 15 or 16.

The settling tub 11 is set into the ground, as indicated in Figure 4. A retaining plate 40 is provided adjacent the settling tub and the ends of the plate are supported by retaining walls 41, as indicated in Figures 1 and 4. A tapping block 42 provided with an opening 43 extends from the outlet opening 30 of the settling tub through the plate 40 thereby establishing communication between the outlet opening of the settling tub and the iron runner 31 which leads to the pig bed 32.

In the practice of our invention, substantially all of the globules of iron suspended in the slag which was skimmed by the gate 6 and diverted into the runner 10 are settled in the settling tub, so that the slag which is delivered to the slag pit is substantially free from iron. This results in a slag which is denser and more homogeneous than slags heretofore produced by other processes.

The globules of iron which have been collected in the settling tub are cast in the form of pig iron which may be used for the same purposes as the pig iron produced from the iron flowing from the runner 8.

We have illustrated and described the present preferred form of our invention. It is to be understood, however, that the invention may be otherwise embodied or practiced within the scope of the following claims.

We claim:

1. In combination with a blast furnace skimming runner having means for separating the molten slag from the iron therein, a slag runner for receiving the slag separated by said means, and a settling tub communicating with said slag runner and adapted to cause globules of iron suspended in the slag to settle in the tub, said tub being spaced a substantial distance from the skimming runner and in communication therewith through the slag runner, the settling tub being substantially wider than the slag runner in order to decrease the velocity of the slag flowing through the tub so as to cause the suspended globules of iron to settle to the bottom of the tub.

2. In combination with a blast furnace skimming runner having means for separating the molten slag from the iron therein, a slag runner for receiving the slag separated by said means, a settling tub communicating with said slag runner and adapted to cause globules of iron suspended in the slag to settle in the tub, said tub being spaced a substantial distance from the skimming runner and in communication therewith through the slag runner, the settling tub being substantially wider than the slag runner in order to decrease the velocity of the slag flowing through the tub so as to cause the suspended globules of iron to settle to the bottom of the tub, said tub having a fixed tapping block provided with an opening which may be closed by a plug and through which the settled iron may be withdrawn from the settling tub.

3. In combination with a blast furnace skimming runner having means for separating the molten slag from the iron therein, a slag runner for receiving the slag separated by said means, a settling tub communicating with said slag runner and adapted to cause globules of iron suspended in the slag to settle in the tub, said tub being spaced a substantial distance from the skimming runner and in communication therewith through the slag runner, the settling tub being substantially wider than the slag runner in order to decrease the velocity of the slag flowing through the tub so as to cause the suspended globules of iron to settle to the bottom of the tub, said tub having a fixed tapping block provided with an opening which may be closed by a plug and through which the settled iron may be withdrawn from the settling tub, and an iron receiver disposed close to the settling tub and in communication therewith through the tapping block.

4. The method of treating blast furnace slag, comprising skimming slag from iron flowing from a blast furnace, the skimmed slag containing suspended globules of iron, flowing the slag for a substantial distance through a slag runner, and decreasing the velocity of the slag by flowing it into a settling tub which is substantially wider than the slag runner, thereby causing the suspended globules of iron to settle to the bottom of the tub.

5. The method of treating blast furnace slag, comprising skimming slag from iron flowing from a blast furnace, the skimmed slag containing suspended globules of iron, flowing the slag for a substantial distance through a slag runner, decreasing the velocity of the slag by flowing it into a settling tub which is substantially wider than the slag runner, thereby causing the suspended globules of iron to settle to the bottom of the tub, and delivering the iron collected in the tub directly to an iron receiver.

In testimony whereof we have hereunto set our hands.

JOHN M. HUGHES.
RICHARD C. BUTLER.